3,312,533
CERAMIC ARTICLE WITH SINTERED METALLIC LAYER AND FLUX

Theodoor Peter Johannes Botden, Johannes Theodorus Klomp, and Adrianus Johannes Cornelis van der Ven, all of Emmasingel, Eindhoven, Netherlands, assignors to North American Philips Company, Inc., New York, N.Y., a corporation of Delaware
No Drawing. Filed May 27, 1964, Ser. No. 370,726
Claims priority, application Netherlands, June 26, 1963, 294,599
3 Claims. (Cl. 29—182.3)

The invention relates to a method of applying a sintered layer containing a high-melting-point metal to a ceramic article by applying a powdered high-melting-point metal mixed with an addition to the surface of this article and subsequently sintering the mass.

Such methods are known. Molybdenum, which has a high melting point is generally used as the metal and titanium hydride or manganese as the addition.

It is known that by the known methods coherent layers having satisfactory adhesion can be applied, for example, to articles of alumina having a comparatively high degree of purity, for example, containing up to 96% by weight of $Al_2O_3$.

Recent known developments have yielded alumina having a high purity (the content of $Al_2O_3$ being about 99% or higher) and a great density which has a melting point higher than 1,900° C. This alumina may be used advantageously at many points in electrical equipment and, for example, also, as an envelope for metal-vapor discharge lamps which are operated at high temperatures. During the assembly of the said equipment and lamps bonds must frequently be made between ceramic parts and metal parts. In order to make such bonds it is often required to start by providing a thin layer of a high-melting-point metal on the ceramic part.

It has now been found that although by a known method such layers can be applied to articles of alumina of the said purity and great density the resulting layers do not adhere sufficiently to these articles. Molybdenum layers applied in known manner to articles having a content of alumina of, for example, 96% exhibit tensile strengths of approximately 700 kgm./cm.$^2$ or higher. Molybdenum layers applied in this manner to articles of the said alumina of high purity exhibit tensile strengths lower than 200 kgm./cm.$^2$. For many uses such tensile strengths are too low. Apart from this disadvantage other disadvantages, for example insufficient vacuum-tightness and inadequate thermal load capacity, become manifest in various uses of articles of alumina of high purity and great density to which metal layers are applied in known manner.

The invention provides a method of applying layers of a high-melting-point metal to articles of alumina of high purity and great density which does not suffer from the said limitations. The method in accordance with the invention may also be used advantageously for applying such layers to articles consisting of alumina of lower purity or of another ceramic material. Even at elevated temperatures the applied layers have excellent mechanical properties and they exhibit a satisfactory or very satisfactory adherence. Joints made to metals by soldering are vacuum-tight.

In the method in accordance with the invention the high-melting-point metal is applied to the ceramic article to be treated in the form of a powder mixed with an addition mainly consisting of CaO or of a mixture of CaO and one or more high-melting-point oxides or compounds thereof, whereupon the applied mass is sintered.

The invention relates to a method of applying a sintered layer containing a high-melting-point metal to a ceramic article and particularly to an article of alumina of high purity and great density, by applying a mixture of a finely divided high-melting-point metal and an addition to the surface of the said article, subsequently sintering the applied mass which method is characterized in that the addition used is a material mainly consisting of CaO, of a mixture of CaO and $Al_2O_3$, and/or $SiO_2$ of a compound made from two or more of these oxides and containing Ca or a mixture of two or more of such compounds or of a mixture of one or more of such compounds and one or more of the said oxides, the molar ratio $Al_2O_3$:CaO in the addition being smaller than 2.25, while the molar ratio $(Al_2O_3+CaO):SiO_2$ is greater than 0.35.

The material of which the addition is made may contain up to approximately 25% by weight of other oxides, such as oxides of alkali metals, for example sodium, of other alkaline earth metals, for example magnesium, strontium or barium, or, for example, of boron, titanium, manganese or zinc.

With the method in accordance with the invention, on alumina of high purity and great density metal layers having satisfactory adhesion are obtained especially if in the material used for the addition the molar ratio $Al_2O_3$:CaO lies between 1.0 and 0.1, and particularly between 0.60 and 0.15. In this respect, satisfactory results were also obtained with material in which the molar ratio $(Al_2O_3+CaO):SiO_2$ lies between 0.7 and 8.0, and particularly between 1.0 and 4.0.

In cases where the devices manufactured by the method in accordance with the invention are exposed at higher temperatures to vapor of alkali metals, for example of sodium or cesium, use is preferably made of materials of compositions containing no or comparatively little $SiO_2$. In these cases, materials consisting of CaO and/or $Al_2O_3$ are particularly suitable; in particular satisfactory results were obtained with a material mainly consisting of CaO and preferably of 50 to 100% by weight of CaO and 0 to 50% by weight of $Al_2O_3$.

In an example of the method, 60 to 80 parts by weight of a powder (particle size a few microns) of a high-melting-point metal, for example or platinum, were mixed with 40 to 20 parts by weight of the above-mentioned oxides and a solution of a binder, for example nitrocellulose. Mixtures thus obtained were ground in ball mills until the particle size of the metal was smaller than approximately 1$\mu$ and the metal powder, the oxides and the binder were sufficiently mixed. A thin layer of resulting material was applied to the ceramic body to be metallized, whereupon the whole was heated in an atmosphere of hydrogen, nitrogen and hydrogen or air for approximately 30 minutes at a temperature between 1,200° C. and 1,600° C., depending upon the composition of the oxide mixture used. The warming-up rate was generally approximately 30° C. per minute, and the cooling rate was frequently approximately 20° C. per minute.

For example, a molybdenum layer approximately 40 microns thick was applied to an end face of a rod of circular cross section made of alumina of high purity (99.8% of $Al_2O_3$) and great density having a diameter of 5 mm. by applying to the said face a mixture prepared in the manner described hereinbefore and consisting of 80 parts by weight of molybdenum (particle size approximately 1$\mu$), 20 parts by weight of a mixture of 54.0% by weight of CaO, 41.1% by weight of $Al_2O_3$ and 4.9% by weight of MgO and 100 parts by weight of a solution of 20 gm. of nitrocellulose in 100 cm.$^3$ of butylacetate and subsequently heating the whole in an atmosphere of moist hydrogen and nitrogen for 30 minutes at 1,450° C. The warming-up rate was approximately 30° C./min.; the cooling rate was approximately 20° C./min. As a result of the treatment the molybdenum powder was sintered to compactness so as to form a conducting layer to which solder adhered satisfactorily. This was proved when a rod of fernico was soldered (in an atmosphere of hydrogen at 1,000° C.) to the molybdenum layer by means of a solder consisting of 70% by weight of Au, 16% by weight of Cu and 14% by weight of Ni and then subjected to a breaking test. Breakage occurred in the alumina rod. It was found that the breaking strength exceeded 2,000 kgm./cm.$^2$.

The mixtures of oxides to be used in the method in accordance with the invention may alternatively be heated separately, preferably to their melting temperatures, whereupon the resulting pre-reacted material, which contains compounds of the oxides, may be applied in the manner described hereinbefore. The method may also start with compounds from which the oxides are obtained by heating, for example with carbonates, or with compounds of the oxides concerned.

In the manner described, layers of other metals such as tungsten, platinum, niobium and tantalum were applied to ceramic articles of various compositions consisting, for example, mainly of uranium oxide, zirconium oxide, beryllium oxide, magnesia, high-melting-point silicates such as $MgO.SiO_2$, or of $MgO.Al_2O_3$, and to articles having a content of from 87 to 99% of alumina or consisting of pure alumina. The method may also be used for applying metal layers to other ceramic material such as silicates, aluminates, zirconates, titanates and ferrites.

After sintering, the mixture of oxides used in the method in accordance with the invention consist of a vitreous phase; depending upon the treatment at higher temperatures and the composition of the mixtures, a greater or lesser part thereof may pass to a crystalline phase. The formation of a crystalline phase is promoted by slow cooling and heating for a comparatively long time to temperatures below the melting point.

Ceramic articles metallised by the method in accordance with the invention may be bonded in known manner to metal articles, for example articles of molybdenum, tungsten, niobium, tantalum, platinum or fernico. Consequently, the method may be of particular importance for the manufacture of, for example, electron tubes, gas discharge lamps and tubes thermo-electric elements, uranium oxide fuel elements and generally of structures in which joints must be made between ceramic articles and metal articles. The method is of particular importance in cases in which joints must be made between metal articles and articles of alumina of high purity and great density. As a result of the high softening temperature of the oxides and the mixtures thereof used in the method in accordance with the invention and of the compounds obtained therefrom by reaction, and due to the satisfactory mechanical properties, adherence and gas tightness at high temperatures of joints made between ceramic parts and metal parts of devices by the method in accordance with the invention, this method may be used in devices which are exposed to high temperatures. The method in accordance with the invention also provides the possibility of taking full advantage of the favorable properties of the recently developed alumina of high purity and great density, for example, if such alumina is used in high-pressure sodium vapor discharge lamps which are operated at high temperatures and produce a high output of white light.

The method in accordance with the invention may also be used for applying conducting metal layers to ceramic articles.

The table below gives examples of compositions of materials which are used as additions in the method in accordance with the invention. The contents of oxides are expressed in percent by weight. T indicates the temperature in ° C. at which sintering was performed in the metallising step. In the examples 1, 3, 4, 5, 7, 8 and 13 to 18 powdered molybdenum, in the examples 6, 9, 11 and 12 powdered platinum and in the examples 2 and 10 powdered niobium was used. The experiments were carried out in the manner described hereinbefore,

TABLE

| Experiment No. | CaO | $Al_2O_3$ | $SiO_2$ | Other oxides | T | Percentage by weight of oxides | Percentage by weight of powdered metal |
|---|---|---|---|---|---|---|---|
| 1 | 100 | | | | 1,400 | 20 | 80 |
| 2 | 82 | 18 | | | 1,500 | 20 | 80 |
| 3 | 50 | 50 | | | 1,500 | 20 | 80 |
| 4 | 48 | 52 | | | 1,500 | 25 | 75 |
| 5 | 40.4 | 10.8 | 48.8 | | 1,350 | 20 | 80 |
| 6 | 40.4 | 10.8 | 48.8 | | 1,350 | 35 | 65 |
| 7 | 37.7 | 16.4 | 36.8 | | 1,300 | 30 | 70 |
| 8 | 54 | 41.1 | | | 1,400 | 20 | 80 |
| 9 | 37.5 | | 56.3 | MgO, 4.9 | 1,450 | 20 | 80 |
| 10 | 45.1 | 47.2 | | BaO, 6.2 | 1,400 | 30 | 70 |
| 11 | 37.5 | | 56.3 | MgO, 7.7 | 1,400 | 25 | 75 |
| 12 | 29.8 | 36.6 | 33.6 | MnO, 6.2 | 1,400 | 20 | 80 |
| 13 | 30.3 | 8.1 | 36.6 | BaO, 25.0 | 1,350 | 20 | 80 |
| 14 | 33.6 | 9.0 | 40.4 | SrO, 17.0 | 1,350 | 25 | 75 |
| 15 | 36.5 | 9.8 | 44.7 | $Na_2O$, 9.0 | 1,350 | 25 | 75 |
| 16 | 37.5 | 10.0 | 45.0 | $B_2O_3$, 7.5 | 1,350 | 20 | 80 |
| 17 | 33.3 | 8.6 | 38.1 | ZnO, 20.0 | 1,350 | 30 | 70 |
| 18 | 34.4 | 9.1 | 41.5 | MnO, 15.0 | 1,350 | 20 | 80 |

What is claimed is:

1. As an article of manufacture, a body of alumina of at least 96% purity having at least a portion of a surface thereof covered with an adherent, sintered layer consisting of 60 to 80% by weight of a high-melting point metal selected from the group consisting of platinum, tungsten, niobium and tantalum and the balance essentially a calcium-containing material consisting of calcium oxide, aluminum oxide, and silicon dioxide, the molar ratio $$AlO_3 : CaO$$

being less than 2.25 and the molar ratio $$(Al_2O_3 + CaO) : SiO_2$$

being greater than 0.35.

2. An article of manufacture as claimed in claim 1, in which the molar ratio $Al_2O_3 : CaO$ is between 1.0 and 0.1.

3. An article of manufacture as claimed in claim 2, in which the molar ratio $(Al_2O_3 + CaO) : SiO_2$ is between 0.7 and 8.0.

References Cited by the Examiner

UNITED STATES PATENTS

| | | | |
|---|---|---|---|
| 2,902,756 | 9/1959 | Cavanaugh | 117—22 X |
| 2,928,755 | 3/1960 | Branstadt | 117—22 |
| 3,061,482 | 10/1962 | Grant | 75—206 X |
| 3,110,571 | 11/1963 | Alexander | 117—22 X |
| 3,241,995 | 3/1966 | Pulfrich et al. | 117—22 |

CARL D. QUARFORTH, *Primary Examiner.*

BENJAMIN R. PADGETT, *Examiner.*

A. J. STEINER, *Assistant Examiner.*